United States Patent
Xu

(12) 
(10) Patent No.: US 10,999,663 B2
(45) Date of Patent: May 4, 2021

(54) LOUDSPEAKER FIXING STRUCTURE AND DISPLAY DEVICE

(71) Applicant: BOE TECHNOLOGY GROUP CO., LTD., Beijing (CN)

(72) Inventor: Jian Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 175 days.

(21) Appl. No.: 15/983,127

(22) Filed: May 18, 2018

(65) Prior Publication Data

US 2019/0104350 A1 Apr. 4, 2019

(30) Foreign Application Priority Data

Sep. 29, 2017 (CN) .......................... 201721275334.5

(51) Int. Cl.
*H04R 1/02* (2006.01)
*A47B 97/00* (2006.01)
*F16M 13/02* (2006.01)
*H04N 5/64* (2006.01)

(52) U.S. Cl.
CPC ............ *H04R 1/026* (2013.01); *A47B 97/00* (2013.01); *F16M 13/02* (2013.01); *H04N 5/642* (2013.01); *H04R 1/025* (2013.01); *A47B 2097/005* (2013.01); *H04R 2499/15* (2013.01)

(58) Field of Classification Search
CPC .......... H04R 1/06; H04R 1/025; H04R 1/026; A47B 97/00; A47B 2097/005; F16M 13/02; H04N 5/642; A04R 2499/15; F16B 2200/20; F16B 2200/10; Y10T 403/57; Y10T 403/5706

USPC ................................................ 248/200.1, 201
See application file for complete search history.

(56) References Cited

U.S. PATENT DOCUMENTS

| | | | | |
|---|---|---|---|---|
| 1,408,073 A * | 2/1922 | Burrell | ............... | A44B 17/0011 24/356 |
| 1,485,724 A * | 3/1924 | Scully | ................ | A44B 17/0011 24/681 |
| 6,133,843 A * | 10/2000 | Davidson | ............... | G08B 7/062 174/481 |
| 6,718,559 B1 * | 4/2004 | Davidson | ............. | A42B 3/0406 2/209.13 |
| 7,130,432 B2 * | 10/2006 | Lee | ......................... | H04R 1/025 381/87 |
| 7,894,182 B2 * | 2/2011 | Wang | .................... | G06F 1/1605 349/56 |

(Continued)

*Primary Examiner* — Kimberly T Wood
(74) *Attorney, Agent, or Firm* — Brooks Kushman P.C.

(57) ABSTRACT

A loudspeaker fixing structure and a display device are provided. The loudspeaker fixing structure includes: a fixing frame configured to be connected to a back plate of the display device; a pair of fixing side plates, opposite to each other and configured to be connected to a loudspeaker body; fixing members, fixed on the fixing frame and arranged in a one-to-one correspondence with the fixing side plates, and in each pair of the fixing side plate and the fixing member, the fixing member is at a side of one fixing side plate away from the other fixing side plate, the fixing member is fixed to the fixing side plate through a curved protrusion and a curved groove, and a protrusive direction of the curved protrusion is perpendicular to the fixing side plate.

12 Claims, 10 Drawing Sheets

(56) References Cited

U.S. PATENT DOCUMENTS

| | | | | |
|---|---|---|---|---|
| 7,995,786 B2* | 8/2011 | Yu | ............ | H04R 1/025 |
| | | | | 381/333 |
| 8,458,869 B2* | 6/2013 | Giannasca | ............ | F16B 5/0628 |
| | | | | 24/686 |
| 8,913,778 B2* | 12/2014 | Mitsuhashi | ............ | H04R 1/028 |
| | | | | 381/395 |
| 2003/0059077 A1* | 3/2003 | Kambe | ............ | H04R 1/02 |
| | | | | 381/333 |
| 2008/0031485 A1* | 2/2008 | Yu | ............ | H04R 1/025 |
| | | | | 381/386 |
| 2010/0129148 A1* | 5/2010 | Giannasca | ............ | F16B 5/0628 |
| | | | | 403/361 |
| 2011/0290974 A1* | 12/2011 | Wu | ............ | H04R 1/025 |
| | | | | 248/346.03 |
| 2013/0070956 A1* | 3/2013 | Yamanaka | ............ | H04R 1/025 |
| | | | | 381/433 |
| 2013/0182884 A1* | 7/2013 | Mitsuhashi | ............ | H04R 1/028 |
| | | | | 381/395 |
| 2015/0238013 A1* | 8/2015 | Chen | ............ | F16M 13/02 |
| | | | | 248/201 |

* cited by examiner

LOUDSPEAKER FIXING STRUCTURE AND DISPLAY DEVICE

CROSS-REFERENCE TO RELATED APPLICATION

This application claims priority to Chinese Patent Application No. 201721275334.5 filed on Sep. 29, 2017, which is incorporated herein by reference in its entirety.

TECHNICAL FIELD

The present disclosure relates to a field of display technology, and in particular to a loudspeaker fixing structure and a display device.

BACKGROUND

In a display device in the related art, the loudspeaker is fixed to the backlight by fixing the screw or the elastic component to the back plate groove. However, when the display device is vibrated in multiple directions or the loudspeaker operates in a large volume for a long period of time, the connection between the back plate and the screw or the elastic component may become poor, which may cause noise during the use of the loudspeakers and thus affect the sound effects of the loudspeaker.

SUMMARY

A loudspeaker fixing structure is provided in the present disclosure, applied to a display device, including: a fixing frame configured to be connected to a back plate of the display device; a pair of fixing side plates opposite to each other and configured to be connected to a loudspeaker body; fixing members, fixed on the fixing frame and arranged in a one-to-one correspondence with the fixing side plates, and in a pair of the fixing side plate and the fixing member, the fixing member is at a side of one fixing side plate away from the other fixing side plate, the fixing member is fixed to the fixing side plate through a curved protrusion and a curved groove, and a protrusive direction of the curved protrusion is perpendicular to the fixing side plate.

According to the loudspeaker fixing structure in the present disclosure, when the loudspeaker body is connected to the fixing frame, the fixing side plates oppositely arranged on the loudspeaker body and the fixing members are in a one-to-one correspondence, and each fixing side plate is snapped to the corresponding fixing member through the curved protrusion and the curved groove, so as to fix the loudspeaker body to the fixing member through the cooperation of the curved protrusion and the curved groove. Furthermore, the fixing member is connected to the fixing frame, so as to fix the loudspeaker body to the fixing frame and further to the display device. Through the snapping connection of the curved protrusion and the curved groove, the loudspeaker body is fixed at multiple angles, and the loudspeaker body is mounted to the display device through the fixing frame, thereby strengthening the connection between the loudspeaker body and the fixing frame which may become weak in the case that the direction of the fixing force between the loudspeaker body and the fixing frame is single, preventing the occurrence of noise of the loudspeaker caused by the movement of the loudspeaker body relative to the display device, and improving the sound effect of the loudspeaker and prolonging the service life thereof.

Therefore, by arranging the fixing member and the fixing frame between the loudspeaker body and the display device, the loudspeaker body is fixed at multiple angles, thereby strengthening the connection between the loudspeaker body and the fixing frame which may become weak in the case that the direction of the fixing force between the loudspeaker body and the fixing frame is single, preventing the occurrence of noise of the loudspeaker caused by the movement of the loudspeaker body relative to the display device, and improving the sound effect of the loudspeaker and prolonging the service life thereof.

Optionally, the curved protrusion is on the fixing side plate, and the curved groove is in the fixing member.

Optionally, a bar-like protrusion is in an area embraced by the curved protrusion on the fixing side plate, and the fixing member includes a bar-like groove in cooperation with the bar-like protrusion.

Optionally, the curved groove is in the fixing side plate, and the curved protrusion is on the fixing member.

Optionally, a bar-like protrusion is in an area embraced by the curved protrusion on the fixing member, and the fixing side plate includes a bar-like groove in cooperation with the bar-like protrusion.

Optionally, the curved protrusion is a continuous protrusion.

Optionally, the curved protrusion includes at least two curved sub-protrusions separated from each other.

Optionally, a free end of the bar-like protrusion includes a first ridge extending along a lengthwise direction of the bar-like protrusion, and the bar-like groove includes a first groove in cooperation with the first ridge.

Optionally, a free end of the curved protrusion includes a second ridge extending towards a shaft axis of the curved protrusion, and the curved groove includes a second groove in cooperation with the second ridge.

Optionally, the fixing frame includes at least one frame body configured to be connected to the display device, the frame body includes a mounting surface, and a mounting hole configured to connect the frame body to the fixing member is at the mounting surface.

Optionally, the fixing member includes a cap at a side of the fixing member adjacent to the frame body, and the cap is configured to be snapped to the mounting hole to connect the fixing member to the fixing frame.

Optionally, the fixing frame includes two frame bodies in a one-to-one correspondence with the fixing members.

Optionally, the fixing frame includes one frame body, and each fixing member is snapped to the frame body.

Optionally, a material of the fixing member includes a flexible material.

Optionally, the first groove is at a side of the bar-like groove away from an opening of the bar-like groove.

Optionally, the curved protrusion forms a hollow cylinder, a free end of the curved protrusion includes a second ridge extending towards a shaft axis of the hollow cylinder, and the curved groove includes a second groove in cooperation with the second ridge.

Optionally, the second groove is at a side of the curved groove away from an opening of the curved groove.

A display device is further provided in the present disclosure, including the above loudspeaker fixing structure.

DETAILED DESCRIPTION

Figure 1:
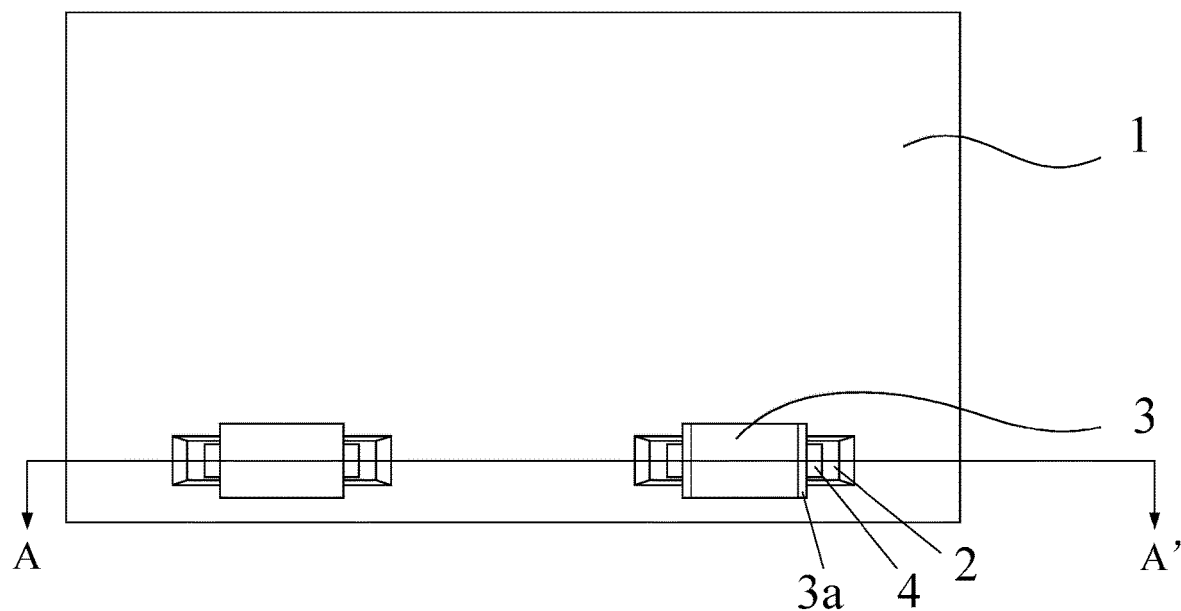
FIG. 1 is a top view of a display device in some embodiments of the present disclosure.
Figure 2:
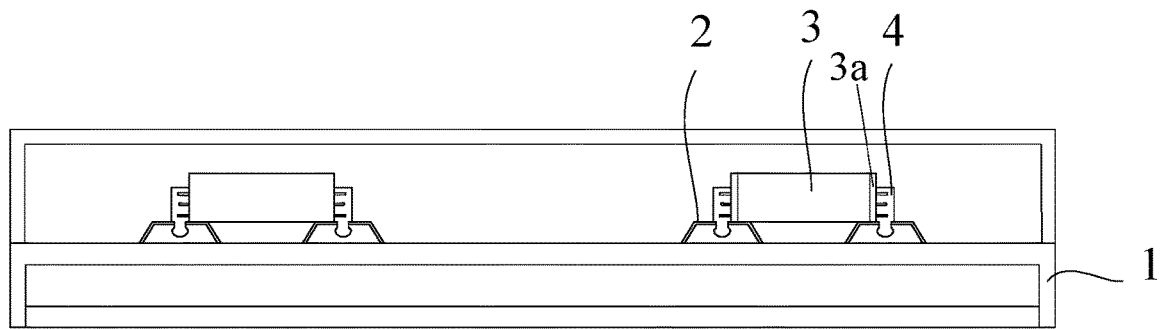
FIG. 2 is a sectional view of a loudspeaker fixing structure of the display device along line A-A' in FIG. 1 in some embodiments of the present disclosure.
Figure 3:
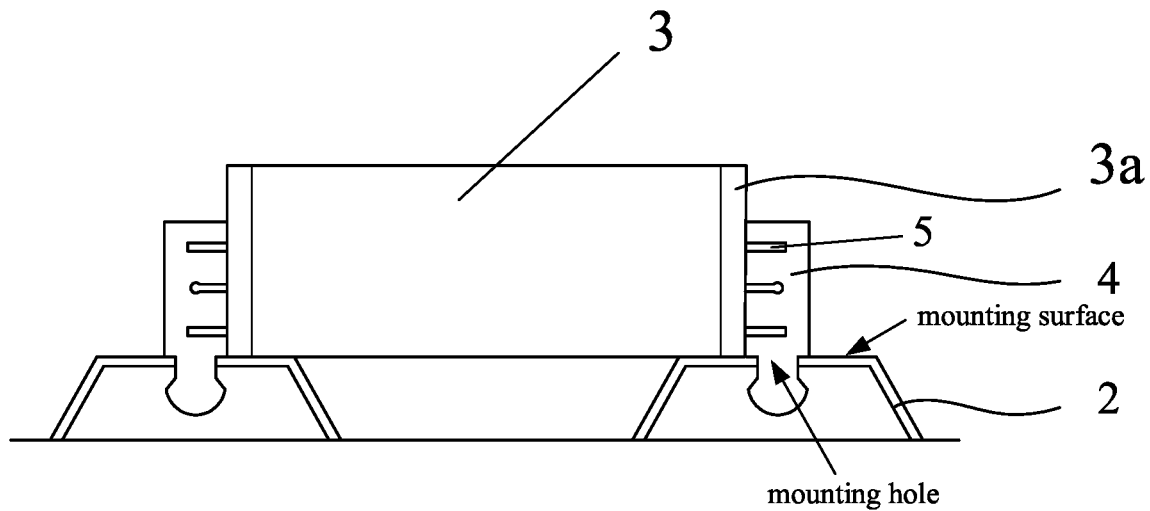
FIG. 3 is a schematic view of a loudspeaker fixing structure in the case of a curved protrusion being a closed-loop protrusion in some embodiments of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

A loudspeaker fixing structure is provided in some embodiments of the present disclosure, applied to a display device, including:

a fixing frame 2 configured to be connected to a back plate 1 of the display device;

a pair of fixing side plates opposite to each other and configured to be connected to a loudspeaker body 3;

fixing members 4, fixed on the fixing frame 2 and arranged in a one-to-one correspondence with the fixing side plates, and in a pair of the fixing side plate and the fixing member 4, the fixing member 4 is at a side of one fixing side plate away from the other fixing side plate, the fixing member 4 is fixed to the fixing side plate through a curved protrusion 5 and a curved groove 6, and a protrusive direction of the curved protrusion 5 is perpendicular to the fixing side plate.

According to the loudspeaker fixing structure in the present disclosure, when the loudspeaker body 3 is connected to the fixing frame 2, the fixing side plates oppositely arranged on the loudspeaker body 3 and the fixing members 4 are in a one-to-one correspondence, and each fixing side plate is snapped to the corresponding fixing member 4 through the curved protrusion 5 and the curved groove 6, so as to fix the loudspeaker body 3 to the fixing member 4 through the cooperation of the curved protrusion 5 and the curved groove 6. Furthermore, the fixing member 4 is connected to the fixing frame 2, so as to fix the loudspeaker body 3 to the fixing frame 2 and further to the display device. Through the snapping connection of the curved protrusion 5 and the curved groove 6, the loudspeaker body 3 is fixed at multiple angles, and the loudspeaker body 3 is mounted to the display device through the fixing frame 2, thereby strengthening the connection between the loudspeaker body 3 and the fixing frame 2 which may become weak in the case that the direction of the fixing force between the loudspeaker body 3 and the fixing frame 2 is single, preventing the occurrence of noise of the loudspeaker caused by the movement of the loudspeaker body 3 relative to the display device, and improving the sound effect of the loudspeaker and prolonging the service life thereof.

Therefore, by arranging the fixing member 4 and the fixing frame 2 between the loudspeaker body 3 and the display device, the loudspeaker body 3 is fixed at multiple angles, thereby strengthening the connection between the loudspeaker body 3 and the fixing frame 2 which may become weak in the case that the direction of the fixing force between the loudspeaker body 3 and the fixing frame 2 is single, preventing the occurrence of noise of the loudspeaker caused by the movement of the loudspeaker body 3 relative to the display device, and improving the sound effect of the loudspeaker and prolonging the service life thereof.

As shown in FIG. 1 to FIG. 5, in some embodiments of the present disclosure, in each pair of fixing member 4 and fixing side plate, the curved protrusion 5 is on the fixing side plate, and the curved groove 6 is in the fixing member 4. The fixing member 4 is snapped to the fixing side plate through the curved protrusion 5 and the curved groove 6, and a protrusive direction of the curved protrusion 5 is perpendicular to the fixing side plate.

According to the loudspeaker fixing structure in the present disclosure, when the loudspeaker body 3 is connected to the fixing frame 2, the fixing side plates oppositely arranged on the loudspeaker body 3 and the fixing members 4 are in a one-to-one correspondence, and each fixing side plate is snapped to the corresponding fixing member 4 through the curved protrusion 5 and the curved groove 6, so as to fix the loudspeaker body 3 to the fixing member 4 through the cooperation of the curved protrusion 5 and the curved groove 6. Furthermore, the fixing member 4 is connected to the fixing frame 2, so as to fix the loudspeaker body 3 to the fixing frame 2 and further to the display device. Through the snapping connection of the curved protrusion 5 and the curved groove 6, the loudspeaker body 3 is fixed at multiple angles, and the loudspeaker body 3 is mounted to the display device through the fixing frame 2, thereby strengthening the connection between the loudspeaker body 3 and the fixing frame 2 which may become weak in the case that the direction of the fixing force between the loudspeaker body 3 and the fixing frame 2 is single, preventing the occurrence of noise of the loudspeaker caused by the movement of the loudspeaker body 3 relative to the display device, and improving the sound effect of the loudspeaker and prolonging the service life thereof.

Therefore, by arranging the fixing member 4 and the fixing frame 2 between the loudspeaker body 3 and the display device, the loudspeaker body 3 is fixed at multiple angles, thereby strengthening the connection between the loudspeaker body 3 and the fixing frame 2 which may become weak in the case that the direction of the fixing force between the loudspeaker body 3 and the fixing frame 2 is single, preventing the occurrence of noise of the loudspeaker caused by the movement of the loudspeaker body 3 relative to the display device, and improving the sound effect of the loudspeaker and prolonging the service life thereof.

As shown in FIG. 4 to FIG. 7, in some embodiments of the present disclosure, a bar-like protrusion 7 is in an area embraced by the curved protrusion 5 on the fixing side plate, and the fixing member 4 includes a bar-like groove 8 in cooperation with the bar-like protrusion 7.

According to the loudspeaker fixing structure in some embodiments of the present disclosure, the fixing member 4 is snapped to the fixing side plate through the curved protrusion 5 and the curved groove 6, thereby restricting the movement of the loudspeaker 3; the bar-like protrusion 7 is arranged in the area embraced by the curved protrusion 5 on the fixing side plate to cooperate with the bar-like groove 8, thereby restricting the rotation of the loudspeaker 3, such that the rotation of the loudspeaker may be restricted effectively. Therefore, through the curved protrusion 5 and the curved groove 6, it is able to prevent the loudspeaker body 3 from moving relative to the display device when the loudspeaker works, thereby improving the sound effect of the loudspeaker and protecting the loudspeaker during the transportation.

Figure 6:
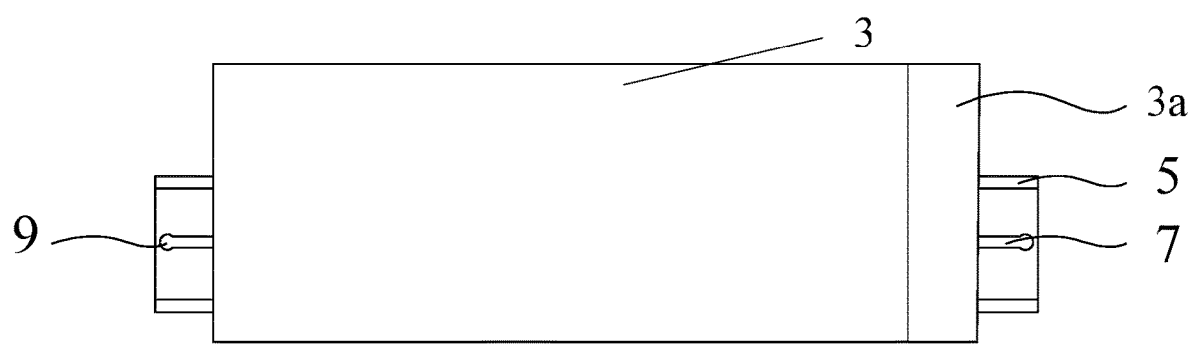
FIG. 6 is a schematic view of a loudspeaker body in the case of a curved protrusion being a closed-loop protrusion in some embodiments of the present disclosure.
Figure 7:
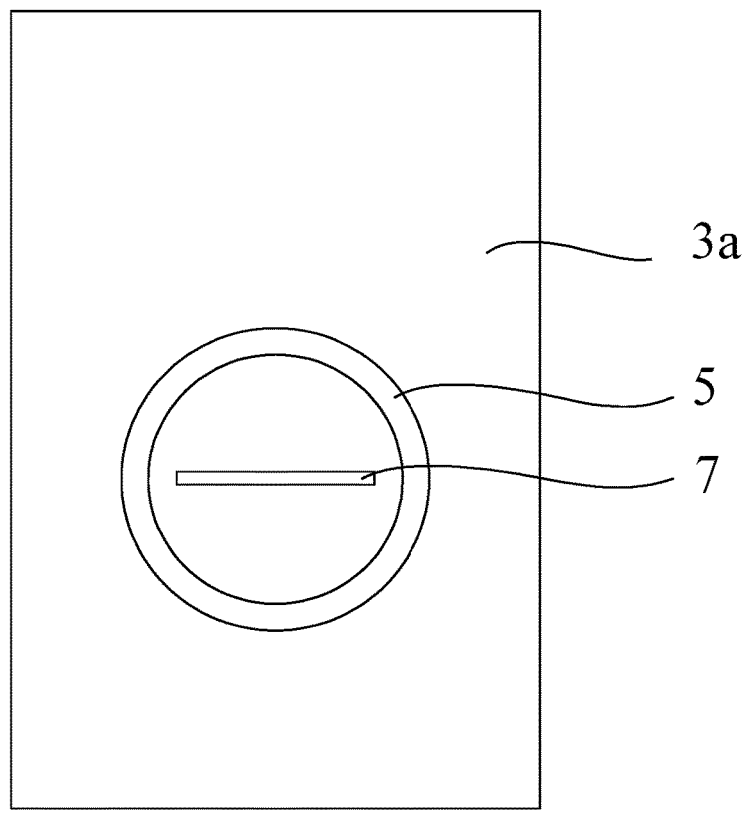
FIG. 7 is a side view of the loudspeaker body shown in FIG. 6.
Figure 8:
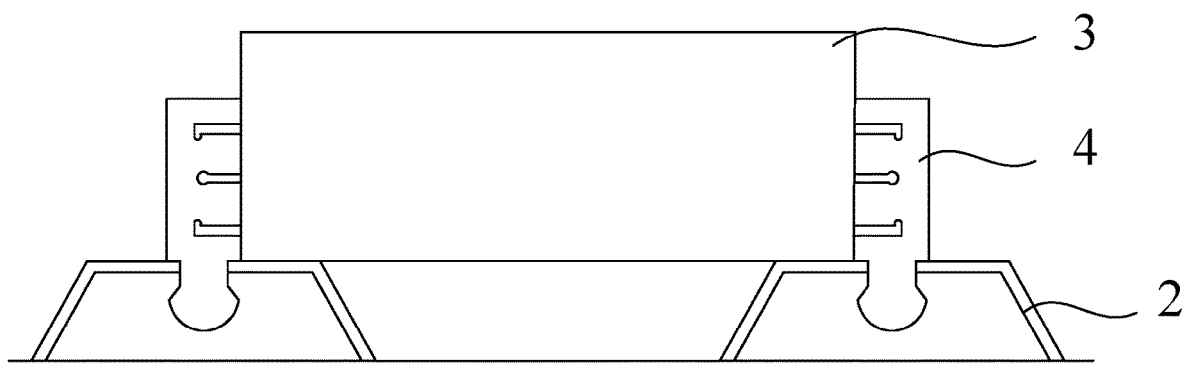
FIG. 8 is a schematic view of a loudspeaker fixing structure in the case of a curved protrusion consisting of a plurality of curved sub-protrusions in some embodiments of the present disclosure.

As shown in FIGS. 6 and 7, in some embodiments of the present disclosure, in each pair of fixing member 4 and fixing side plate, the curved protrusion 5 on the fixing side plate is a closed-loop protrusion. Specifically, the curved protrusion 5 may a closed-loop circle or a closed-loop oval.

Figure 12:
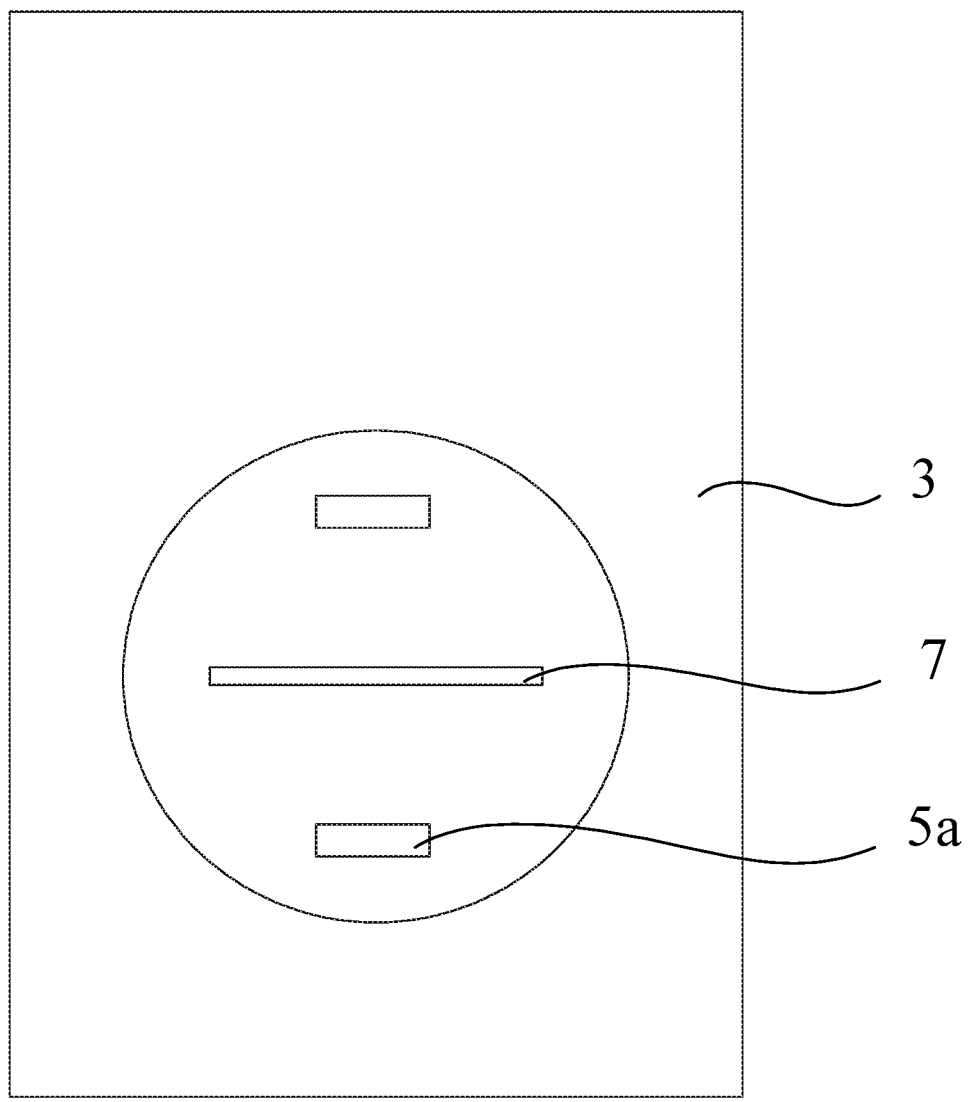
FIG. 12 is a side view of the loudspeaker body shown in FIG. 11.

As shown in FIG. 12, in some embodiments of the present disclosure, in each pair of fixing member 4 and fixing side plate, the curved protrusion 5 on the fixing side plate includes at least two curved sub-protrusions separated from each other.

According to the loudspeaker fixing structure in some embodiments of the present disclosure, the curved protrusion 5 on the fixing side plate is a closed-loop protrusion or includes at least two curved sub-protrusions separated from each other, and the loudspeaker may be limited by the curved sub-protrusions and the curved groove 6. When the loudspeaker body 3 is mounted to the fixing member 4, the fixing side plates oppositely arranged on the loudspeaker body 3 is connected to the fixing member 4, thereby limiting the loudspeaker 3, preventing the loudspeaker from moving relative to the display device during the transportation and protecting the loudspeaker, preventing the occurrence of noise of the loudspeaker caused by the movement of the loudspeaker body 3 relative to the display device, and improving the sound effect. The fixing member 4 may be provided with only one closed-loop curved groove 6 even if two curved sub-protrusions are arranged on the fixing side plate.

Figure 4:
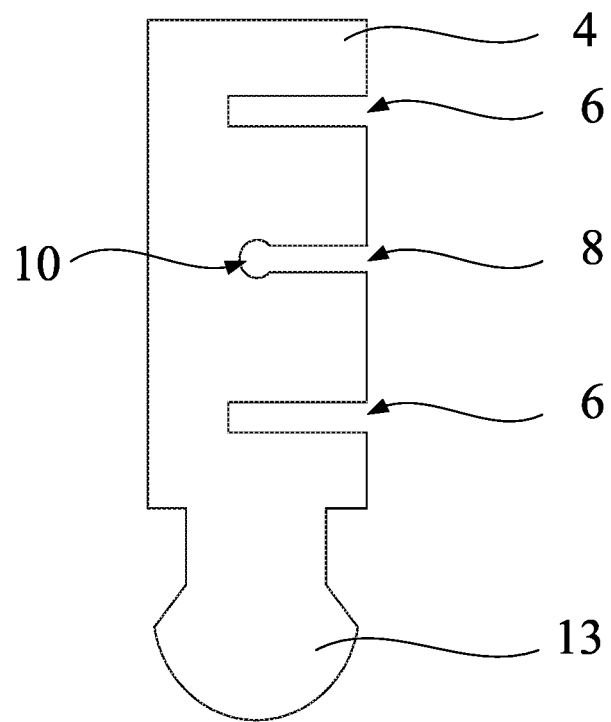
FIG. 4 is a schematic view of a fixing member in the case of a curved protrusion being a closed-loop protrusion in some embodiments of the present disclosure.
Figure 5:
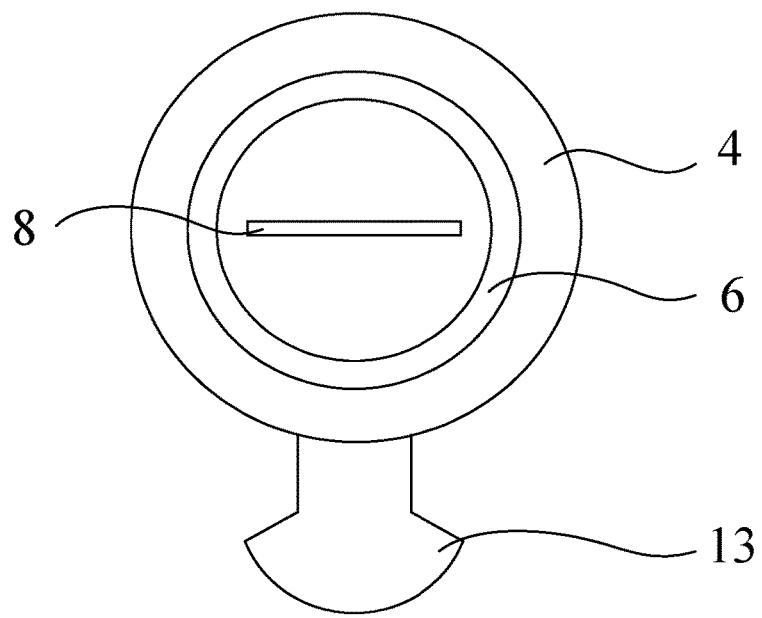
FIG. 5 is an elevation view of the fixing member shown in FIG. 4.

As shown in FIGS. 4 and 5, in some embodiments of the present disclosure, the curved groove 6 may be arranged close to the bar-like groove 8 or at an edge of the fixing member 4, as long as the two curved sub-protrusions seems like to clip the fixing member 4. Furthermore, by the cooperation of the curved groove 6 and the curved protrusion 5, the fixing side plate may be fixed to the fixing member 4 at multiple angles.

As shown in FIGS. 4 and 6, in some embodiments of the present disclosure, a free end of the bar-like protrusion 7 includes a first ridge 9 extending along a lengthwise direction of the bar-like protrusion 7, and the bar-like groove 8 includes a first groove 10 in cooperation with the first ridge 9.

As shown in FIG. 4, in some embodiments of the present disclosure, the first groove 10 is at a side of the bar-like groove 8 away from an opening of the bar-like groove 8.

According to the loudspeaker fixing structure in some embodiments of the present disclosure, the free end of the bar-like protrusion 7 includes the first ridge 9, and the bar-like groove 8 includes the first groove 10 in cooperation with the first ridge 9. By snapping the first ridge 9 to the first groove 10, it is able to improve the stability of the connection between the loudspeaker and the fixing member 4.

Figure 9:
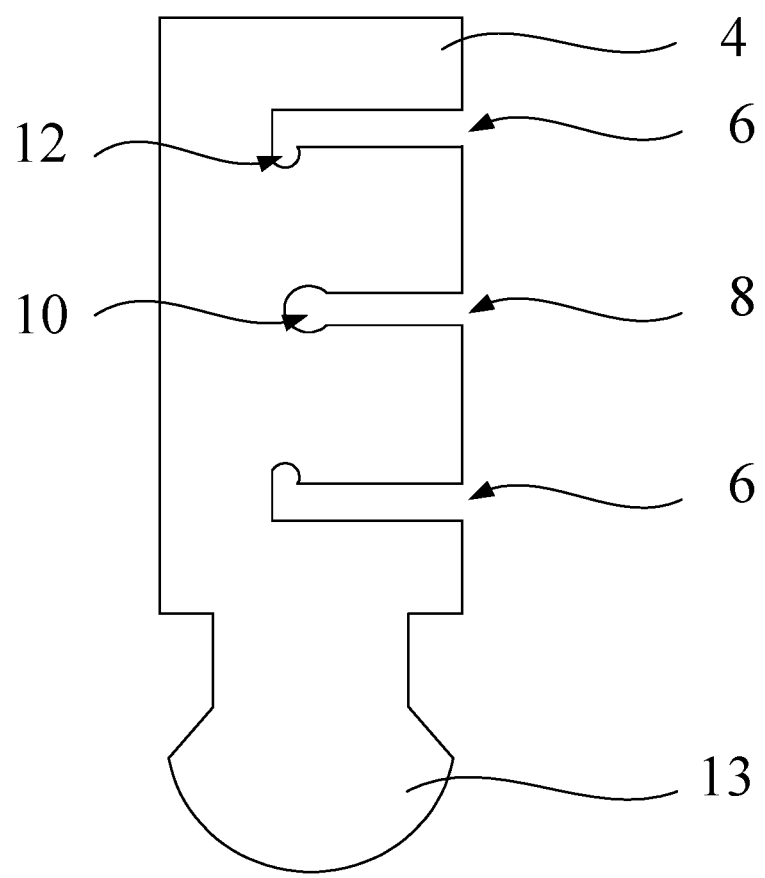
FIG. 9 is a schematic view of a fixing member in the case of a curved protrusion consisting of a plurality of curved sub-protrusions in some embodiments of the present disclosure.
Figure 10:
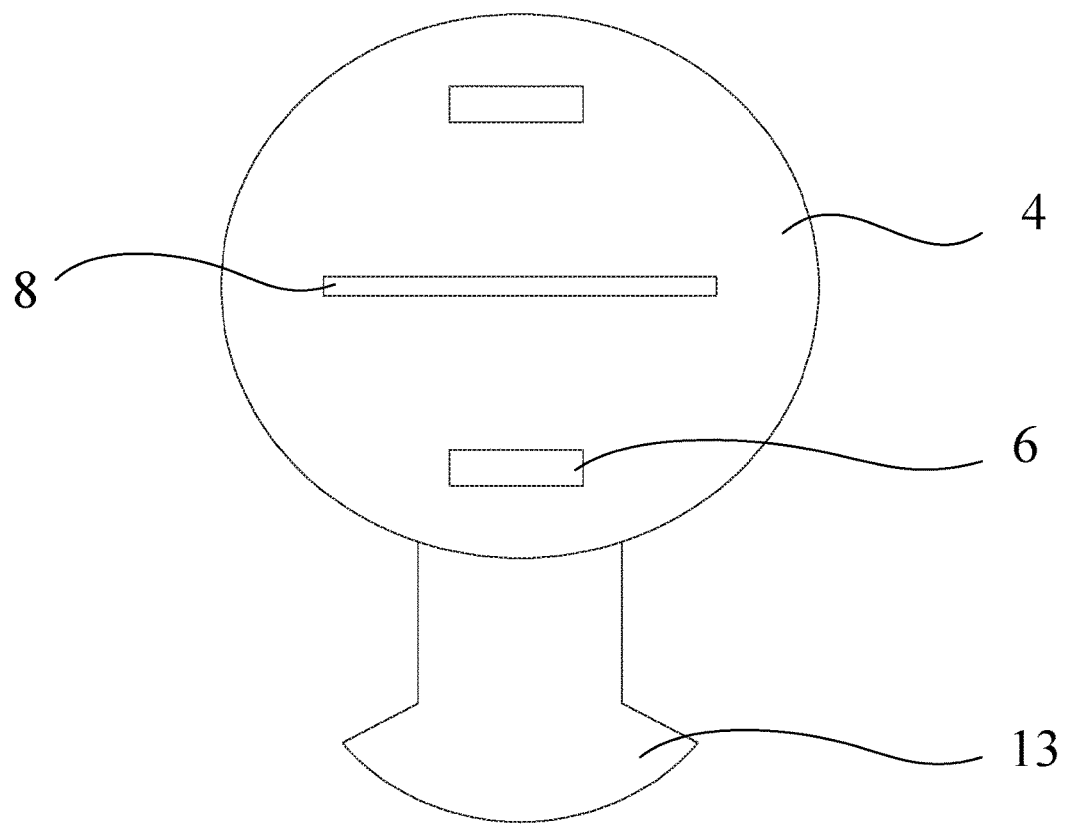
FIG. 10 is an elevation view of the fixing member shown in FIG. 9.
Figure 11:
FIG. 11 is a schematic view of a loudspeaker body in the case of a curved protrusion consisting of a plurality of curved sub-protrusions in some embodiments of the present disclosure.

As shown in FIGS. 9 and 11, in some embodiments of the present disclosure, a free end of the curved protrusion 5 includes a second ridge 11 extending towards a shaft axis of the curved protrusion 5, and the curved groove 6 includes a second groove 12 in cooperation with the second ridge 11.

As shown in FIGS. 7, 9 and 11, in some embodiments of the present disclosure, the curved protrusion 5 forms a hollow cylinder, a free end of the curved protrusion 5 includes a second ridge 11 extending towards a shaft axis of the hollow cylinder, and the curved groove 6 includes a second groove 12 in cooperation with the second ridge 11.

As shown in FIG. 9, in some embodiments of the present disclosure, the second groove 12 is at a side of the curved groove 6 away from an opening of the curved groove 6.

According to the loudspeaker fixing structure in some embodiments of the present disclosure, the curved protrusion 5 has the second ridge 11, and the curved groove 6 has the second groove 12 in cooperation with the second ridge 11. By snapping the second ridge 11 to the second groove 12, it is able to improve the stability of the connection between the loudspeaker and the fixing member 4.

Figure 14:
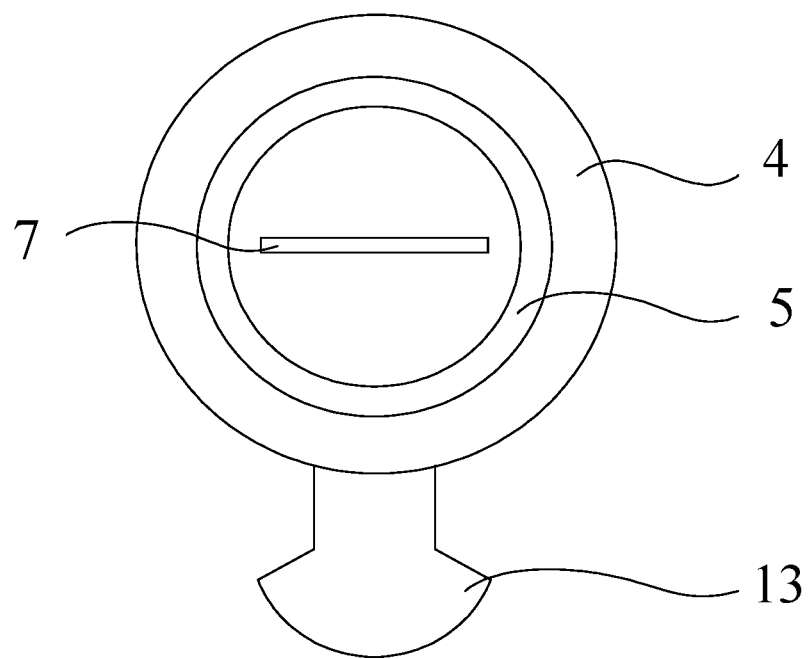
FIG. 14 is a side view of a fixing member in some embodiments of the present disclosure.
Figure 15:
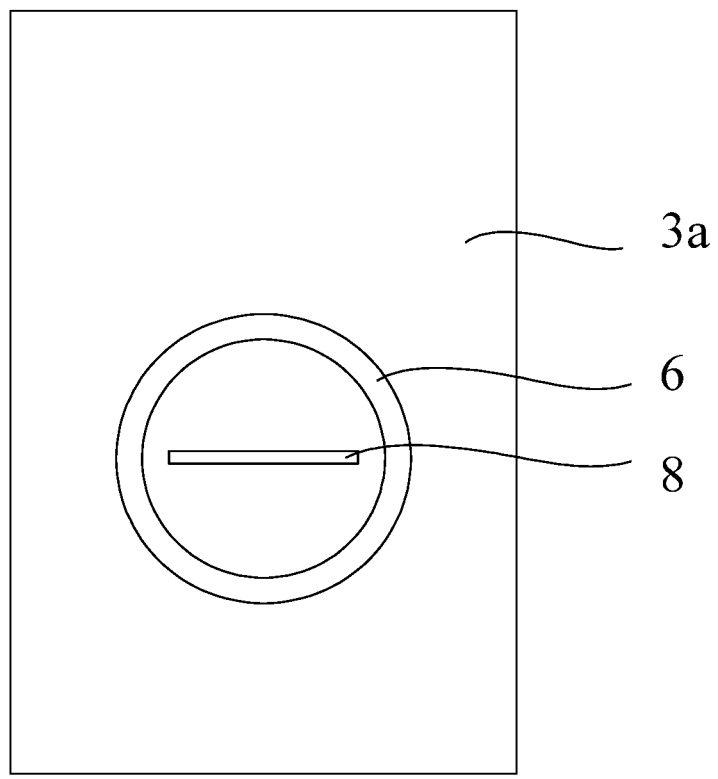
FIG. 15 is a side view of a fixing side plate in some embodiments of the present disclosure.

As shown in FIGS. 14 and 15, in some embodiments of the present disclosure, in each pair of fixing member 4 and fixing side plate, the curved protrusion 5 is on the fixing member 4, and the curved groove 6 is in the fixing side plate. The fixing member 4 is snapped to the fixing side plate through the curved protrusion 5 and the curved groove 6, and a protrusive direction of the curved protrusion 5 is perpendicular to the fixing side plate.

According to the loudspeaker fixing structure in the present disclosure, when the loudspeaker body 3 is connected to the fixing frame 2, the fixing side plates oppositely arranged on the loudspeaker body 3 and the fixing members 4 are in a one-to-one correspondence, and each fixing side plate is snapped to the corresponding fixing member 4 through the curved protrusion 5 and the curved groove 6, so as to fix the loudspeaker body 3 to the fixing member 4 through the cooperation of the curved protrusion 5 and the curved groove 6. Furthermore, the fixing member 4 is connected to the fixing frame 2, so as to fix the loudspeaker body 3 to the fixing frame 2 and further to the display device. Through the snapping connection of the curved protrusion 5 and the curved groove 6, the loudspeaker body 3 is fixed at multiple angles, and the loudspeaker body 3 is mounted to the display device through the fixing frame 2, thereby strengthening the connection between the loudspeaker body 3 and the fixing frame 2 which may become weak in the case that the direction of the fixing force between the loudspeaker body 3 and the fixing frame 2 is single, preventing the occurrence of noise of the loudspeaker caused by the movement of the loudspeaker body 3 relative to the display device, and improving the sound effect of the loudspeaker and prolonging the service life thereof.

Therefore, by arranging the fixing member 4 and the fixing frame 2 between the loudspeaker body 3 and the display device, the loudspeaker body 3 is fixed at multiple angles, thereby strengthening the connection between the loudspeaker body 3 and the fixing frame 2 which may become weak in the case that the direction of the fixing force between the loudspeaker body 3 and the fixing frame 2 is single, preventing the occurrence of noise of the loudspeaker caused by the movement of the loudspeaker body 3 relative to the display device, and improving the sound effect of the loudspeaker and prolonging the service life thereof.

As shown in FIG. 14, in some embodiments of the present disclosure, in each pair of fixing member 4 and fixing side plate, the curved protrusion 5 is on the fixing member 4, a bar-like protrusion 7 is in an area embraced by the curved protrusion 5 on the fixing member 4, and the fixing side plate includes a bar-like groove 8 in cooperation with the bar-like protrusion 7.

According to the loudspeaker fixing structure in some embodiments of the present disclosure, the fixing member 4 is snapped to the fixing side plate through the curved protrusion 5 and the curved groove 6, thereby restricting the movement of the loudspeaker 3; the bar-like protrusion 7 is arranged in the area embraced by the curved protrusion 5 on the fixing side plate to cooperate with the bar-like groove 8, thereby restricting the rotation of the loudspeaker 3, such that the rotation of the loudspeaker may be restricted effectively. Therefore, through the curved protrusion 5 and the curved groove 6, it is able to prevent the loudspeaker body 3 from moving relative to the display device when the loudspeaker works, thereby improving the sound effect of the loudspeaker and protecting the loudspeaker during the transportation.

As shown in FIG. 14, in some embodiments of the present disclosure, in each pair of fixing member 4 and fixing side plate, the curved protrusion 5 on the fixing member 4 is a closed-loop protrusion. Specifically, the curved protrusion 5 may a closed-loop circle or a closed-loop oval.

Figure 16:
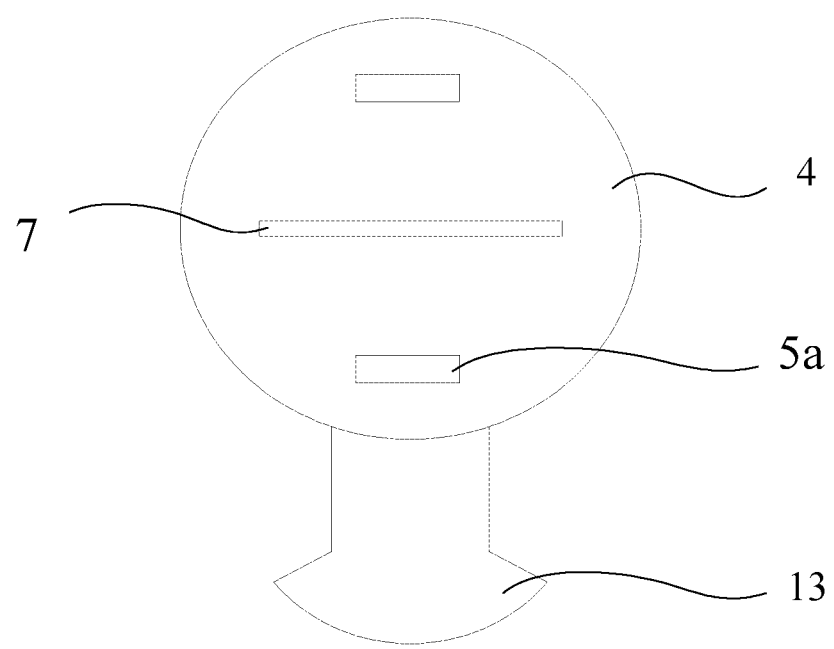
FIG. 16 is a side view of a fixing member in some embodiments of the present disclosure.

As shown in FIG. 16, in some embodiments of the present disclosure, in each pair of fixing member 4 and fixing side plate, the curved protrusion 5 on the fixing member 4 includes at least two curved sub-protrusions separated from each other.

According to the loudspeaker fixing structure in some embodiments of the present disclosure, the curved protrusion 5 on the fixing member 4 is a closed-loop protrusion or includes at least two curved sub-protrusions separated from each other, and the loudspeaker may be limited by the curved sub-protrusions and the curved groove 6. When the loudspeaker body 3 is mounted to the fixing member 4, the fixing side plates oppositely arranged on the loudspeaker body 3 is connected to the fixing member 4, thereby limiting the loudspeaker, preventing the loudspeaker from moving relative to the display device during the transportation and protecting the loudspeaker, preventing the occurrence of noise of the loudspeaker caused by the movement of the loudspeaker body 3 relative to the display device, and improving the sound effect. The fixing side plate may be provided with only one closed-loop curved groove 6 even if two curved sub-protrusions are arranged on the fixing member 4. By the cooperation of the curved groove 6 and the curved protrusion 5, the fixing side plate may be fixed to the fixing member 4 at multiple angles.

Figure 17:
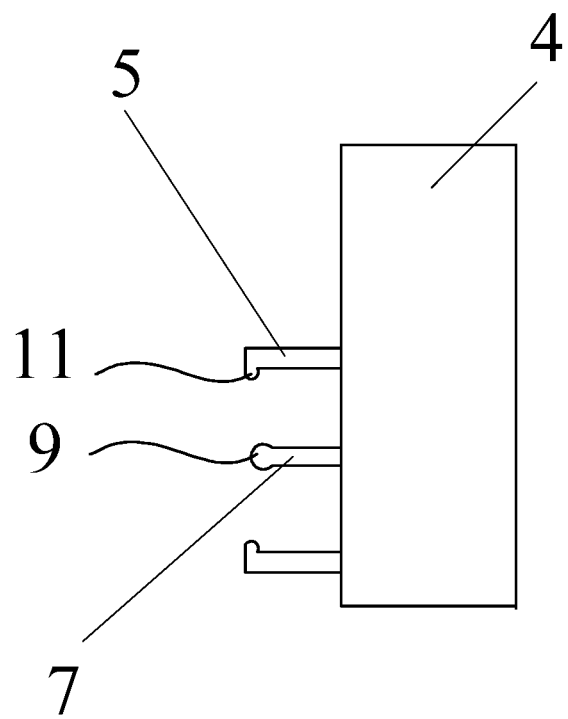
FIG. 17 is a side view of a fixing member in some embodiments of the present disclosure.
Figure 18:
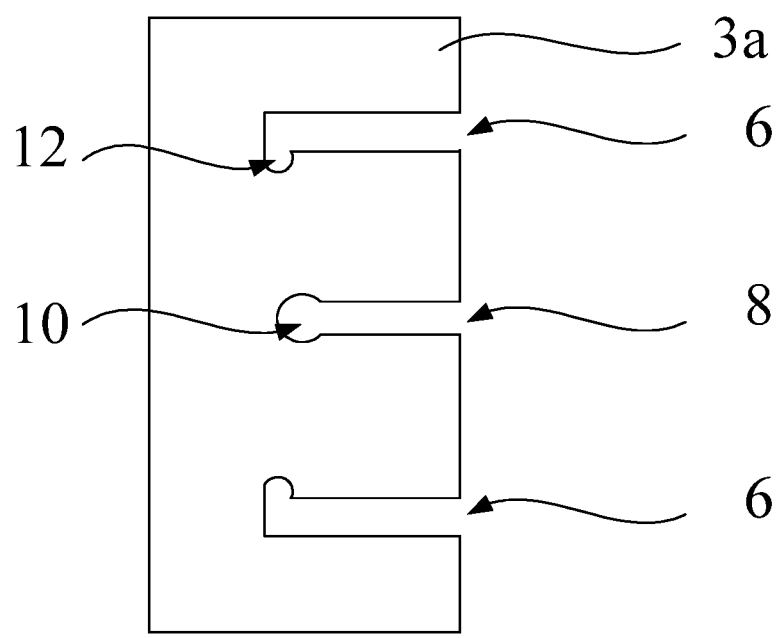
FIG. 18 is a side view of a fixing side plate in some embodiments of the present disclosure.

As shown in FIGS. 17 and 18, in some embodiments of the present disclosure, a free end of the bar-like protrusion 7 includes a first ridge 9 extending along a lengthwise direction of the bar-like protrusion 7, and the bar-like groove 8 includes a first groove 10 in cooperation with the first ridge 9.

As shown in FIG. 18, in some embodiments of the present disclosure, the first groove 10 is at a side of the bar-like groove 8 away from an opening of the bar-like groove 8.

According to the loudspeaker fixing structure in some embodiments of the present disclosure, the free end of the bar-like protrusion 7 includes the first ridge 9, and the bar-like groove 8 includes the first groove 10 in cooperation with the first ridge 9. By snapping the first ridge 9 to the first groove 10, it is able to improve the stability of the connection between the loudspeaker and the fixing member 4.

As shown in FIGS. 17 and 18, in some embodiments of the present disclosure, a free end of the curved protrusion 5 includes a second ridge 11 extending towards a shaft axis of the curved protrusion 5, and the curved groove 6 includes a second groove 12 in cooperation with the second ridge 11.

As shown in FIGS. 14, 17 and 18, in some embodiments of the present disclosure, the curved protrusion 5 forms a hollow cylinder, a free end of the curved protrusion 5 includes a second ridge 11 extending towards a shaft axis of the hollow cylinder, and the curved groove 6 includes a second groove 12 in cooperation with the second ridge 11.

As shown in FIG. 18, in some embodiments of the present disclosure, the second groove 12 is at a side of the curved groove 6 away from an opening of the curved groove 6.

According to the loudspeaker fixing structure in some embodiments of the present disclosure, the curved protrusion 5 has the second ridge 11, and the curved groove 6 has the second groove 12 in cooperation with the second ridge 11. By snapping the second ridge 11 to the second groove 12, it is able to improve the stability of the connection between the loudspeaker and the fixing member 4.

Of course, the fixing member 4 may be provided with both a curved protrusion and a curved groove, meanwhile the loudspeaker body 3 may be provided with a curved groove in cooperation with the curved protrusion on the fixing member 4 and a curved protrusion in cooperation with the curved groove in the fixing member 4. The detailed description thereof is omitted herein.

Figure 13:
FIG. 13 is a schematic view of a loudspeaker fixing structure in the case of a curved protrusion consisting of a plurality of curved sub-protrusions and a curved groove being a closed-loop groove in some embodiments of the present disclosure.

As shown in FIG. 13, in some embodiments of the present disclosure, a first protrusion 14 is arranged on the fixing side plate, and the first protrusion 14 is snapped to the fixing member 4.

To be specific, a second protrusion 15 is arranged at a side of the fixing member 4 away from the fixing frame 2, and a portion of the second protrusion 15 adjacent to the body of the fixing member 4 is concaved inward to form a loop-like groove. In other words, the second protrusion 15 has a neck having a smaller cross-sectional area than that of a head of the second protrusion 15. The first protrusion 14 has an opening at a surface thereof facing the fixing frame 2. The groove of the first protrusion 14 under the opening is matched with the second protrusion 15. That is, the first protrusion 14 has a space therein to receive the head of the second protrusion 15. The head of the second protrusion 15 may be inserted into the inner space of the first protrusion 14 through the opening of the first protrusion 14. Therefore, it is able to snap the fixing member 4 to the first protrusion 14 through the opening of the first protrusion 14 and the second protrusion 15 of the fixing member 4, so as to fix the loudspeaker body 3 to the fixing member 4.

The first protrusion 14 has the opening at the surface thereof facing the fixing frame 2, the second protrusion 15 is arranged at the side of the fixing member 4 away from the fixing frame 2, and the groove under the opening at the surface of the first protrusion 14 facing the fixing frame 2 is matched with the second protrusion 15 of the fixing member 4, so as to snap the loudspeaker body 3 to the fixing member 4.

In some embodiments of the present disclosure, a second protrusion is arranged at a side of the first protrusion 14 adjacent to the fixing frame 2, and a portion of the second protrusion adjacent to the body of the first protrusion 14 is concaved inward to form a loop-like groove. In other words, the second protrusion has a neck having a smaller cross-sectional area than that of a head of the second protrusion. The fixing member 4 has an opening at a surface thereof away from the fixing frame 2. The groove of the fixing member 4 under the opening is matched with the second protrusion. That is, the fixing member 4 has a space therein to receive the head of the second protrusion. The head of the second protrusion may be inserted into the inner space of the fixing member 4 through the opening of the fixing member 4. Therefore, it is able to snap the first protrusion 14 to the fixing member 4 through the opening of the fixing member 4 and the second protrusion of the first protrusion 14, so as to fix the loudspeaker body 3 to the fixing member 4.

As such, the loudspeaker body 3 is limited. When the loudspeaker body 3 is mounted to the fixing member 4, the fixing side plates oppositely arranged on the loudspeaker body 3 is connected to the fixing member 4, thereby limiting the loudspeaker, preventing the loudspeaker from moving relative to the display device during the transportation and protecting the loudspeaker, preventing the occurrence of noise of the loudspeaker caused by the movement of the loudspeaker body 3 relative to the display device, and improving the sound effect.

In some embodiments of the present disclosure, the fixing frame 2 includes a frame body configured to be connected to the display device, the frame body includes a mounting surface, and a mounting hole configured to connect the frame body to the fixing member 4 is at the mounting surface.

As shown in FIG. 4, in some embodiments of the present disclosure, the fixing member 4 includes a cap 13 at a side of the fixing member 4 away from the loudspeaker body 3, and the cap 13 is configured to be snapped to the mounting hole to connect the fixing member 4 to the fixing frame 2.

According to the loudspeaker fixing structure in some embodiments of the present disclosure, the fixing member 4 includes the cap 13 at the side of the fixing member 4 away from the loudspeaker body 3, and the cap 13 is configured to be snapped to the mounting hole to connect the fixing member 4 to the fixing frame 2, thereby connecting the loudspeaker body 3 to the display device.

In some embodiments of the present disclosure, the fixing frame 2 includes two frame bodies in a one-to-one correspondence with the fixing members 4.

In some embodiments of the present disclosure, the fixing frame 2 includes one frame body, and each fixing member 4 is snapped to the frame body.

In some embodiments of the present disclosure, a material of the fixing member 4 includes a flexible material.

According to the loudspeaker fixing structure in some embodiments of the present disclosure, when the loudspeaker is shock, the fixing member 4 made of the flexible material may absorb the shock, so as to reduce the shock to the fixing frame 2, thereby improving the stability of the connection between the loudspeaker body 3 and the display device. When the display device is shock during the transportation, the fixing member 4 made of the flexible material may absorb the shock, thereby prolonging the service life of the loudspeaker.

A display device is further provided in some embodiments of the present disclosure, including the above loudspeaker fixing structure.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A loudspeaker fixing structure, applied to a display device, comprising:
a fixing frame configured to be connected to a back plate of the display device;
a pair of fixing side plates opposite to each other and configured to be connected to a loudspeaker body;
fixing members, fixed on the fixing frame and arranged in a one-to-one correspondence with the fixing side plates, and in the pair of fixing side plates and the fixing members, each of the fixing members is at a side of one fixing side plate of the pair of fixing side plates away from the other fixing side plate of the pair of fixing side plates, each of the fixing members is fixed to the fixing side plate through a curved protrusion and a curved groove, and a protrusive direction of the curved protrusion is perpendicular to the fixing side plate;
wherein the curved protrusion is on the fixing side plate, and the curved groove is in each of the fixing members;
a bar protrusion is in an area embraced by the curved protrusion on the fixing side plate, and each of the fixing members comprises a bar groove in cooperation with the bar protrusion;
a free end of the bar protrusion comprises a first ridge extending along a lengthwise direction of the bar protrusion, and the bar groove comprises a first groove in cooperation with the first ridge;
wherein a free end of the curved protrusion comprises a second ridge extending towards a shaft axis of the curved protrusion, and the curved groove comprises a second groove in cooperation with the second ridge.

2. The loudspeaker fixing structure according to claim 1, wherein the curved groove is in the fixing side plate, and the curved protrusion is on each of the fixing members.

3. The loudspeaker fixing structure according to claim 2, wherein the bar protrusion is in an area embraced by the curved protrusion on each of the fixing members, and the fixing side plate comprises the bar groove in cooperation with the bar protrusion.

4. The loudspeaker fixing structure according to claim 1, wherein the curved protrusion is a continuous protrusion.

5. The loudspeaker fixing structure according to claim 1, wherein the curved protrusion comprises at least two curved sub-protrusions separated from each other.

6. The loudspeaker fixing structure according to claim 1, wherein the fixing frame comprises at least one frame body configured to be connected to the display device, the frame body comprises a mounting surface, and a mounting hole configured to connect the frame body to each of the fixing members is at the mounting surface.

7. The loudspeaker fixing structure according to claim 6, wherein each of the fixing members comprises a cap at a side of each of the fixing members adjacent to the frame body, and the cap is configured to be snapped to the mounting hole to connect each of the fixing members to the fixing frame.

8. The loudspeaker fixing structure according to claim 7, wherein the fixing frame comprises two frame bodies in a one-to-one correspondence with the fixing members.

9. The loudspeaker fixing structure according to claim 7, wherein the fixing frame comprises one frame body, and each of the fixing members is snapped to the frame body.

10. The loudspeaker fixing structure according to claim 1, wherein a material of each of the fixing members comprises a flexible material.

11. The loudspeaker fixing structure according to claim 1, wherein the first groove is at a side of the bar groove away from an opening of the bar groove.

12. A display device, comprising the loudspeaker fixing structure according to claim 1.

\* \* \* \* \*